US008256454B2

United States Patent
Xu et al.

(10) Patent No.: US 8,256,454 B2
(45) Date of Patent: Sep. 4, 2012

(54) DYNAMIC FLAPPER AND METHOD

(75) Inventors: Yang Xu, Houston, TX (US); Keith J. Murphy, Simsbury, CT (US)

(73) Assignee: Baker Hughes Incorporated, Houston, TX (US)

( * ) Notice: Subject to any disclaimer, the term of this patent is extended or adjusted under 35 U.S.C. 154(b) by 414 days.

(21) Appl. No.: 12/617,395

(22) Filed: Nov. 12, 2009

(65) Prior Publication Data

US 2011/0108749 A1    May 12, 2011

(51) Int. Cl.
*F16K 1/18* (2006.01)
*F16K 15/03* (2006.01)
*F16K 51/00* (2006.01)
(52) U.S. Cl. ........................ 137/527.8; 251/303; 251/338
(58) Field of Classification Search ................ 166/332.8; 137/527.6, 527.8; 251/298, 303, 338
See application file for complete search history.

(56) References Cited

U.S. PATENT DOCUMENTS

| 775,823 | A | * | 11/1904 | Johnson | 137/527 |
| 2,711,188 | A | * | 6/1955 | Nickerson | 137/527.8 |
| 6,085,781 | A | * | 7/2000 | Boutry | 137/527.8 |

OTHER PUBLICATIONS

R. Zbitowsky, et al., Pressure Transient Analysis Data Collected by the Use of a Retrievable Gauge Hanger in Saudi Arabian Gas Wells, SPE 113589, presentation at 2008 SPE/ICoTA Coiled Tubing and Well Intervention Conference, The Woodlands, Texas, USA Apr. 1-2, 2008, pp. 1-8.

* cited by examiner

*Primary Examiner* — John Rivell
*Assistant Examiner* — Kevin Barss
(74) *Attorney, Agent, or Firm* — Cantor Colburn LLP

(57) ABSTRACT

An adjustable moment arm flapper including a flapper defining a cavity there within and a moveable mass system disposed within the cavity, a center of mass of the flapper changeable based upon position of the movable mass and a method for dynamically controlling a flapper.

19 Claims, 1 Drawing Sheet

DYNAMIC FLAPPER AND METHOD

BACKGROUND

In the drilling and completion arts, many different uses of flapper valves are made. These valves are failsafe and robust and hence have been adopted by individual operators and regulatory agencies alike for use in downhole industries. Flappers of flapper valves are generally articulated to a housing in one portion thereof and allowed to swing relatively freely otherwise. Such flappers may be of a number of shapes including square, round, etc. and in the downhole industry are often rounded as tubing strings used in this industry tend to be at least substantially cylindrical.

Flappers are commonly openable hydraulically either by the application of hydraulic pressure through a control line forcing a flow tube to push the flapper open or in the case of an injection valve, applied fluid pressure acting directly upon the flapper. While these configurations work well for their intended purposes, improvements in functionality and/or cost reduction are always welcomed by the art.

SUMMARY

An adjustable moment arm flapper including a flapper defining a cavity there within; and a moveable mass system disposed within the cavity, a center of mass of the flapper changeable based upon position of the movable mass.

A method for dynamically controlling a flapper including employing the flapper An adjustable moment arm flapper including a flapper defining a cavity there within; and a moveable mass system disposed within the cavity, a center of mass of the flapper changeable based upon position of the movable mass; urging the flapper to an open position; and positioning a moveable mass system to shift a center of mass of the flapper away from a pivot point of the flapper.

BRIEF DESCRIPTION OF THE DRAWINGS

Referring now to the drawings wherein like elements are numbered alike in the several Figures.

DETAILED DESCRIPTION

Figure 1:
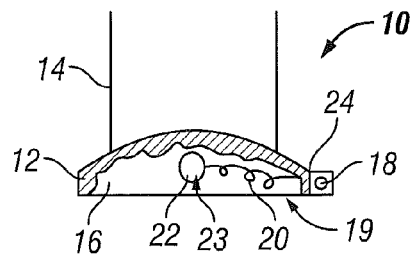
FIG. 1 is a schematic partially broken away representation of a flapper in a closed position.

Referring to FIG. 1, a schematic view of a flapper valve 10 is illustrated. The valve 10 includes a flapper 12 and a housing 14. The valve 10 is similar to existing flapper valves of the art except for the particular construction of the flapper 12. For this reason and to make plain the concept disclosed herein, it will be appreciated that the flapper 12 has been partially broken away to allow visual inspection of its interior. The flapper 12 is configured with a cavity 16 that may have a number of geometrical shapes but will extend substantially diametrically from a pivot pin 18 of the flapper 12. It is to be appreciated that the cavity 16 extending as stated provides for translation of other components discussed hereunder in a direction most effective for the purpose of the invention. It is also to be appreciated that although it is important to provide for extension of the cavity 16 diametrically from the pivot pin, there is no reason that the entirety of the flapper 12 cannot define a cavity (being for example, completely hollow) or some other proportion thereof providing that the translatory motion discussed below is accommodated. Further, it is noted that the cavity will in each embodiment have matter therewithin in at least two phases. For example, there may be solid components and liquid components within the cavity; there may be liquid and gaseous components within the cavity; there may be solid and gaseous components within the cavity; and there may be all three phases of matter within the cavity.

Figure 2:
FIG. 2 is a schematic partially broken away representation of the flapper of FIG. 1 in an open position.

Within the flapper 12 and seen through the broken away portion of the flapper 12, is a movable mass system 19 comprising a biasing member 20 and a weight 22. The weight 22 is connected to the biasing member 20 and the biasing member 20 is connected to a nonmovable portion 24 of the flapper 12 near the pivot pin 18 such as simply an anchor point in the flapper 12. The biasing member 20 is, in one embodiment, a coil spring configured to work primarily in tension. Other equivalently functioning configurations are also contemplated. The purpose of the spring is to move the weight 22 toward the pivot pin 18. The spring 20 is selected to have sufficient tensile force to move the weight 22 toward the pivot pin 18 when the flapper is pivoted to a position that is not vertical. Stated alternatively, when the flapper 12 is pivoted to the fully open position the weight 22 is suspended by the biasing member 20 at a particular position within the flapper 12. The position is ideally close to an end of the cavity 16 opposed to the pivot pin 18. Then as the flapper begins to pivot towards the closed position, the member 20 will begin to be capable of moving the weight toward the pivot pin 18. The more the flapper pivots toward the closed position the more the spring 20 is able to move the weight 22 because the weight is increasingly supported by the flapper so that the spring must overcome less and less of the weight 22 due to gravity. As the flapper gets closer to close then it becomes easier to close since the weight presents a lesser moment arm on the flapper. When the flapper is closer to the open position, shown in FIG. 2, the weight 22 extends the member 20 under the force of gravity and positions itself such that the flapper stays substantially open with less input than prior art flappers need. The member 20 must be carefully configured to provide the correct amount of resistance to the weight 22 during moving and enough resilience to pull the weight back toward the pin 18 once the flapper 12 begins to move toward the closed position. More specifically, and related to each embodiment disclosed herein, the flapper exhibits less resistance to pivotal movement when the flapper is internally in one configuration (internal mass centered closer to the pivot pin 18) than it does when it is internally in another configuration (internal mass centered farther from the pivot pin 18), the configurations being changeable based upon the position of the flapper. Stated alternatively, each embodiment hereof is configured in various ways to increase the mass of the flapper at a point diametrically opposed to the pivot pin 18 as the flapper is opening. The shifting of mass is due to gravitational forces and has the effect of keeping the flapper in the open position and out of the flow there past due to the reduced impetus to move about the pivot pin. This is due to a changing moment arm of the flapper itself. As the weight 22 moves to the largest diametrical position relative to the pivot pin 18 the moment arm increases and as the weight is moved toward the pivot pin 18 by the member 20 the moment arm decreases. The changing moment arm allows the flapper to experience more or less resistance to pivotal movement as noted above.

In various embodiments of the movable mass system, the weight 22 includes a low friction coating or is of a low friction material; the cavity 16 is coated with a low friction material; the weight is endowed with one or more rollers 23 disposed in contact with the flapper to reduce friction between the flapper 12 and the weight 22.

Figure 3:
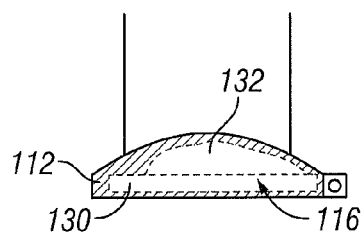
FIG. 3 is a schematic partially broken away representation of an alternate flapper in a closed position.
Figure 4:
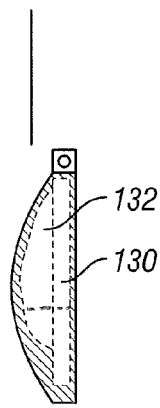
FIG. 4 is a schematic partially broken away representation of the flapper of FIG. 3 in an open position.

In an alternative embodiment, referring to FIGS. 3-8 the movable mass system is altered by replacing the weight 22 and biasing member 20 with a fluid system comprising a liquid component and a gaseous component. As noted above, the functionality of the invention comes from the capability of the flapper to move its center of mass closer to or farther from the pivot pin 18. The fluid system functions similarly in that the gaseous component will automatically find a higher point elevationally whereas the liquid component will find a lower point elevationally. Since the density of the gaseous fluid is distinctly different than the density of the liquid fluid, the center of mass shifts as the liquid component moves relative to the gaseous component. Referring to FIG. 3, it will be appreciated that a flapper 112 is illustrated having a cavity 116 partially occupied by a liquid component 130 and partially occupied with a gaseous component 132. The gaseous component 132 naturally migrates to the elevationally higher position whether the flapper 112 is closed (FIG. 3) or open (FIG. 4). The gas and liquid will move smoothly between these two positions as the flapper 112 moves. As the flapper 112 moves toward the open position and the liquid naturally follows that movement to reposition itself and hence the center of mass of the flapper 112 farther from the pivot pin 18, the functionality of the invention as noted above is effected. The flapper 112 will stay in the open position with the benefit of a longer moment arm at the pivot pin 18 and since the liquid and gaseous components will again reposition upon a closing moment put on the flapper 112 from another input, such as a torsion spring or a flow tube moving out of the way, thus reducing the moment arm acting to hold the flapper 112 open.

In addition to the mere weight of the liquid component versus the gaseous component, it is also possible depending upon fluid selected and environment in which the device is used for buoyancy of the gaseous component to assist in closing the flapper 112 as it nears the closed position because at that point a buoyancy of the gaseous "bubble" will be urging the flapper 112 closed.

Figure 5:
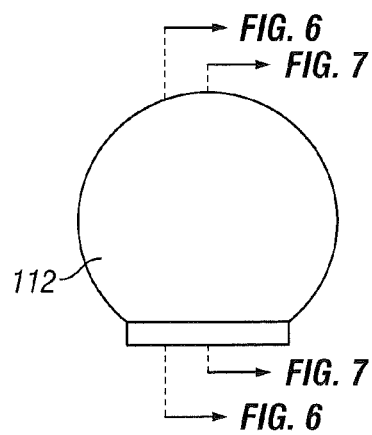
FIG. 5 is a schematic plan view of the flapper illustrated in FIGS. 4 and 5.
Figure 6:
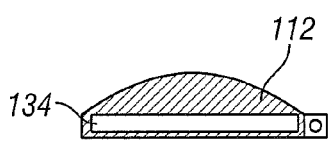
FIG. 6 is a cross sectional view taken along section line 6-6 in FIG. 5.
Figure 7:
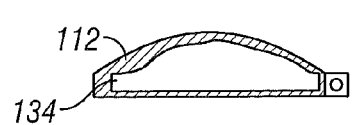
FIG. 7 is a cross sectional view taken along section line 7-7 in FIG. 5.
Figure 8:
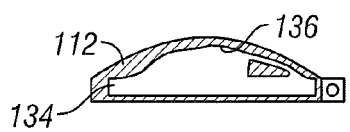
FIG. 8 is a cross sectional view of an alternate embodiment taken along the section line 7-7.

Referring to FIGS. 5, 7 and 8 it will be appreciated that the cavity 116 may comprise substantially a smaller cylindrical or semispherical void 134 atop a larger cylindrical or semispherical void 136 and the smaller void may be entirely joined to the larger void 136 or may only be joined thereto by a channel 138.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. An adjustable moment arm flapper comprising:
a flapper defining a cavity therewithin; and
a moveable mass system including a weight attached to a biasing member, the moveable mass system disposed within the cavity, a center of mass of the flapper changeable based upon position of the movable mass.

2. An adjustable moment arm flapper as claimed in claim 1 wherein the flapper includes a pivot pin.

3. An adjustable moment arm flapper as claimed in claim 2 wherein the cavity extends from proximate the pivot pin to a location diametrically opposed to the pivot pin on the flapper.

4. An adjustable moment arm flapper as claimed in claim 1 wherein the flapper is entirely a cavity.

5. An adjustable moment arm flapper as claimed in claim 1 wherein the biasing member is a spring.

6. An adjustable moment arm flapper as claimed in claim 5 wherein the spring is a tension spring.

7. An adjustable moment arm flapper as claimed in claim 1 wherein the cavity is coated in a low friction material.

8. An adjustable moment arm flapper as claimed in claim 1 wherein the weight is coated with a low friction material.

9. An adjustable moment arm flapper as claimed in claim 1 wherein the weight further includes one or more rollers.

10. An adjustable moment arm flapper as claimed in claim 1 wherein the biasing member is selected to move the weight as the flapper pivots away from a fully open position.

11. An adjustable moment arm flapper as claimed in claim 10 wherein the flapper includes a pivot pin and the weight is moved towards the pivot pin.

12. An adjustable moment arm flapper comprising a flapper defining a cavity therewithin and a moveable mass system disposed within the cavity, a center of mass of the flapper changeable based upon position of the movable mass, wherein the cavity comprises a smaller cylindrical or semispherical void atop a larger cylindrical or semispherical void.

13. An adjustable moment arm flapper as claimed in claim 12 wherein the smaller cylindrical or semispherical void and larger cylindrical or semispherical void are entirely joined.

14. An adjustable moment arm flapper as claimed in claim 12 wherein the smaller cylindrical or semispherical void and larger cylindrical or semispherical void are joined by a channel.

15. A method for dynamically controlling an adjustable moment arm flapper having a flapper defining a cavity therewithin and a moveable mass system disposed within the cavity, a center of mass of the flapper changeable based upon position of the movable mass, the method comprising:
urging the flapper to an open position; and
positioning the moveable mass system to shift the center of mass of the flapper away from a pivot point of the flapper.

16. A method for dynamically controlling a flapper as claimed in claim 15 wherein the method further comprises urging the moveable mass toward the pivot point during closing of the flapper.

17. A method for dynamically controlling a flapper as claimed in claim 16 wherein the urging the moveable mass is by a biasing member.

18. A method for dynamically controlling a flapper as claimed in claim 16 wherein the urging the moveable mass is by gravity and natural fluid flow dynamics.

19. An adjustable moment arm flapper as claimed in claim 12 wherein the moveable mass system is a fluid system comprising a liquid component and a gaseous component.

* * * * *